United States Patent
Fontvieille et al.

(10) Patent No.: US 10,023,191 B2
(45) Date of Patent: Jul. 17, 2018

(54) METHOD FOR CONTROLLING A POWER TRAIN OF A VEHICLE, AND CORRESPONDING DEVICE AND VEHICLE

(71) Applicant: RENAULT s.a.s., Boulogne-billancourt (FR)

(72) Inventors: Laurent Fontvieille, Gif-sur-yvette (FR); Emmanuel Buis, Verrieres-le-buisson (FR); Florent Marchais, Bouray sur Juine (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 15/870,239

(22) Filed: Jan. 12, 2018

(65) Prior Publication Data

US 2018/0134299 A1 May 17, 2018

Related U.S. Application Data

(63) Continuation of application No. 15/312,333, filed as application No. PCT/FR2015/051274 on May 13, 2015.

(30) Foreign Application Priority Data

May 21, 2014 (FR) ...................... 14 54584

(51) Int. Cl.
*B60W 10/00* (2006.01)
*B60W 30/18* (2012.01)
(Continued)

(52) U.S. Cl.
CPC .... *B60W 30/18118* (2013.01); *B60L 15/2009* (2013.01); *B60L 15/2018* (2013.01);
(Continued)

(58) Field of Classification Search
None
See application file for complete search history.

(56) References Cited

U.S. PATENT DOCUMENTS

| | | | | |
|---|---|---|---|---|
| 5,807,205 A | * | 9/1998 | Odaka | B60L 7/00 477/20 |
| 7,698,042 B2 | * | 4/2010 | Shimizu | B60K 6/445 475/2 |

(Continued)

FOREIGN PATENT DOCUMENTS

EP   1 138 545 A1   10/2001

OTHER PUBLICATIONS

International Search Report dated Sep. 30, 2015 in PCT/FR2015/051274 filed May 13, 2015.

(Continued)

*Primary Examiner* — Jonathan M Dager
(74) *Attorney, Agent, or Firm* — Oblon, McClelland, Maier & Neustadt, L.L.P.

(57) ABSTRACT

A method controls a power train of a vehicle immobilized in a parking position, the vehicle being provided with a parking brake device for immobilizing the vehicle and at least one electric motor. The method includes detecting the slope direction and/or slope data when the parking brake device is in an actuated position, detecting that the parking brake device has switched from the actuated position to a released position, and applying a motor torque setpoint to the electric motor in accordance with the detected slope direction and/or slope data.

14 Claims, 3 Drawing Sheets

(51) Int. Cl.
*B60L 15/20* (2006.01)
*B60W 40/076* (2012.01)
*B60W 10/18* (2012.01)
*B60W 10/08* (2006.01)

(52) U.S. Cl.
CPC .......... *B60W 10/08* (2013.01); *B60W 10/182* (2013.01); *B60W 30/18054* (2013.01); *B60W 40/076* (2013.01); *B60L 2240/12* (2013.01); *B60L 2240/30* (2013.01); *B60L 2240/421* (2013.01); *B60L 2240/423* (2013.01); *B60L 2240/642* (2013.01); *B60L 2250/26* (2013.01); *B60L 2270/142* (2013.01); *B60L 2270/145* (2013.01); *B60W 2510/186* (2013.01); *B60W 2550/142* (2013.01); *B60W 2710/083* (2013.01); *B60Y 2300/18141* (2013.01); *Y02T 10/642* (2013.01); *Y02T 10/645* (2013.01); *Y02T 10/72* (2013.01); *Y02T 10/7275* (2013.01); *Y02T 10/7291* (2013.01); *Y02T 90/16* (2013.01)

(56) References Cited

U.S. PATENT DOCUMENTS

| | | | |
|---|---|---|---|
| 7,881,849 B2* | 2/2011 | Shiraki | B60T 7/122 188/72.1 |
| 7,926,889 B2* | 4/2011 | Bell, Jr. | B60L 11/18 303/191 |
| 7,934,589 B2* | 5/2011 | Groner | B60T 7/122 192/219.1 |
| 9,132,811 B2* | 9/2015 | Dufford | B60T 1/005 |
| 9,470,157 B2* | 10/2016 | Liu | B60W 30/18118 |
| 2002/0086772 A1* | 7/2002 | Abe | B60T 7/122 477/102 |
| 2003/0214186 A1* | 11/2003 | Kinder | B60T 7/122 303/192 |
| 2005/0140208 A1* | 6/2005 | Ji | B60T 7/122 303/192 |
| 2005/0211478 A1* | 9/2005 | Sakuma | B60L 7/003 180/65.1 |
| 2006/0049691 A1* | 3/2006 | Deprez | B60T 7/00 303/191 |
| 2007/0083314 A1* | 4/2007 | Corigliano | B60W 40/072 701/80 |
| 2008/0033617 A1* | 2/2008 | Watanabe | B60K 6/44 701/48 |
| 2008/0035444 A1* | 2/2008 | Schiele | F16H 61/0059 192/219.5 |
| 2008/0051252 A1* | 2/2008 | Nishimura | B60T 1/005 477/92 |
| 2008/0051968 A1* | 2/2008 | Belen | B60T 7/12 701/74 |
| 2008/0086255 A1* | 4/2008 | Oshima | B60K 6/445 701/101 |
| 2009/0043465 A1* | 2/2009 | Tomita | B60K 6/40 701/51 |
| 2011/0065548 A1* | 3/2011 | Yu | B60W 10/06 477/203 |
| 2011/0136625 A1* | 6/2011 | Yu | B60W 10/06 477/185 |
| 2011/0184615 A1* | 7/2011 | Marcus | B60W 30/18118 701/58 |
| 2012/0115665 A1* | 5/2012 | Schwekutsch | B60T 13/746 475/150 |
| 2012/0150384 A1* | 6/2012 | Jung | B60W 30/18063 701/31.1 |
| 2012/0203433 A1* | 8/2012 | Higa | B60T 7/042 701/50 |
| 2013/0073163 A1* | 3/2013 | Liu | B60T 7/042 701/70 |
| 2013/0184906 A1* | 7/2013 | Harper | B60L 15/2018 701/22 |
| 2013/0305863 A1* | 11/2013 | Weslati | F16H 63/48 74/411.5 |
| 2015/0100222 A1* | 4/2015 | Beger | B60T 7/122 701/116 |
| 2015/0105949 A1* | 4/2015 | Wright | B60W 10/02 701/22 |
| 2015/0175032 A1* | 6/2015 | Nagamori | B60L 3/0023 701/22 |
| 2015/0303858 A1* | 10/2015 | Katsumata | B60L 15/20 318/139 |
| 2015/0321656 A1* | 11/2015 | Nishikawa | B60K 6/365 192/219.4 |

OTHER PUBLICATIONS

French Search Report dated Jan. 20, 2015 in FR1454584 filed May 21, 2014.

* cited by examiner

METHOD FOR CONTROLLING A POWER TRAIN OF A VEHICLE, AND CORRESPONDING DEVICE AND VEHICLE

BACKGROUND

The invention relates to the field of motor vehicles, in particular any electric or hybrid vehicle equipped with at least one electric motor. The invention relates to a method for controlling a power train of a vehicle when the vehicle is immobilized on a surface exhibiting a slope of any kind. It also relates to a device as well as to the corresponding vehicle.

PRIOR ART

In an electric or hybrid vehicle, at least one electric motor generates a motor torque which is transmitted to the wheels by means of a reduction gear mechanism in order to drive the vehicle. The electric motor is connected to the vehicle by means of mounts making it possible to limit the propagation of the vibrations generated by the electric motor. When the vehicle is immobilized by a parking brake device on a surface, such as a car park or a road exhibiting a more or less steep slope, a force which is dependent on the mass of the vehicle and on the angle of the slope may be exerted on the parking brake device.

One of the problems associated with this force resides in the fact that it leads to tilting of the electric motor about a position of equilibrium corresponding to a neutral or stable position (zero slope). Furthermore, when the parking brake device moves from an applied position to a released position, the mounts return the whole of the power train (GMP) (electric motor, internal combustion engine, gearbox, etc.) in an abrupt manner towards its neutral or stable position of equilibrium, which causes oscillations of the electric motor about its position of equilibrium and noises of mechanical impacts which are propagated inside the passenger compartment of the vehicle and are perceived by the occupants of the vehicle.

Document U.S. Pat. No. 7,496,435 discloses a method for controlling a power train, in which a torque setpoint is applied to a motor torque generated by the electric motor when the parking brake device is in its applied position in order to correct the vibrations and grinding of the parking brake device that are attributable to the variations in the motor torque. However, this control method does not make it possible to prevent the electric motor from tilting about its stable position of equilibrium, in particular when the parking brake device moves from an applied position to a released position and, in particular, if the surface on which the vehicle is immobilized exhibits a slope.

BRIEF SUMMARY

The invention has as its objective, in particular, to overcome all or part of the disadvantages of the prior art.

One objective of the invention is to prevent the abrupt tilting of the electric motor of a power train of an immobilized vehicle when the parking brake device moves from an applied position to a released position, and, by so doing, to prevent the oscillations, vibrations and noises inside the passenger compartment of the vehicle.

Another objective of the invention is to propose a solution which is simple, universal and inexpensive.

These objectives are accomplished by virtue of a method for controlling a power train of a vehicle immobilized in a parking position, the vehicle being equipped with a parking brake device for immobilizing the vehicle and with at least one electric motor, the method being characterized in that it comprises the following steps:
detection of the direction of and/or data for a slope when the parking brake device is in an applied position;
detection of a transition of the parking brake device from the applied position to a released position; and
application of a motor torque setpoint to the electric motor on the basis of the direction of and/or the detected data for the slope.

This solution makes it possible to address the aforementioned problems. In particular, the torque setpoint makes it possible to maintain the electric motor in its initial position after application of the parking brake device and until the latter is in its released position. There are consequently no longer any oscillations of the electric motor, or any jolting when the parking brake device leaves its applied position in order to liberate the electric motor.

According to a particular embodiment of the invention, the method may further comprise a progressive transition step from a non-zero value of the motor torque setpoint towards a zero value. This step enables the motor to be returned into its position of equilibrium corresponding to a situation in which the vehicle would be immobilized on a surface not exhibiting any slope.

In order to manage and control the "liberation" of the electric motor in an optimal manner, it is proposed that the application of the torque setpoint be maintained from the start of the transition from the applied position to the end of the transition to the released position. This enables the electric motor to be kept in a position of equilibrium (different than the position of equilibrium on a zero slope) without giving rise to jolts and oscillations.

In an advantageous manner, the transition of the parking brake device from the applied position to the released position, and back again, is implemented by the actuation of a means for controlling the parking brake device.

According to the method, the detection of the direction of the slope may be is carried out when a means for controlling the parking brake device is in a position of disengagement and when the parking brake device is in its applied position. In this case, the vehicle is still immobilized and ensures that a user or occupant will be capable of controlling the vehicle for the next phase (starting).

According to a variant embodiment, the detection step comprises a step for determining the value of the slope in such a way as to ascertain more accurately the value of the motor torque setpoint to be applied to the GMP. According to this embodiment, the steps for the detection of the direction of and/or the data for the slope and for the determination of the value of the slope may be concurrent. This may be possible by means of a system for controlling the trajectory.

According to another embodiment, the step for the detection of the direction of and/or the data for the slope may comprise a step for the detection of a direction of tilting of the electric motor in relation to a neutral position of said electric motor so as to determine the direction and the steepness of the slope.

Still with the same aim, the step for the detection of the direction of and/or the data for the slope may comprise a step for the detection of the direction of rotation of a means for driving the rotor of the electric motor interacting with the parking brake device in order to immobilize the vehicle.

Advantageously, the method proposes a step for the storage of the direction of and/or the detected data for the slope, so that this information is available on the next occasion on which the vehicle is started (leaving the immobilization position).

The invention also relates to a device for controlling a power train of a vehicle immobilized in a parking position, comprising means arranged so as to implement the method described above.

The invention also has as its object a motor vehicle comprising a power train, a parking brake device to immobilize the vehicle in a parking position, at least one electric motor and a device for controlling said power train which exhibits the above-mentioned characterizing features.

BRIEF DESCRIPTION OF THE DRAWINGS

Other novel characterizing features and advantages can be appreciated from the following description, which is provided by way of indicating and is in no way limiting, with reference to the accompanying drawings, in which.

DETAILED DESCRIPTION

Figure 1:
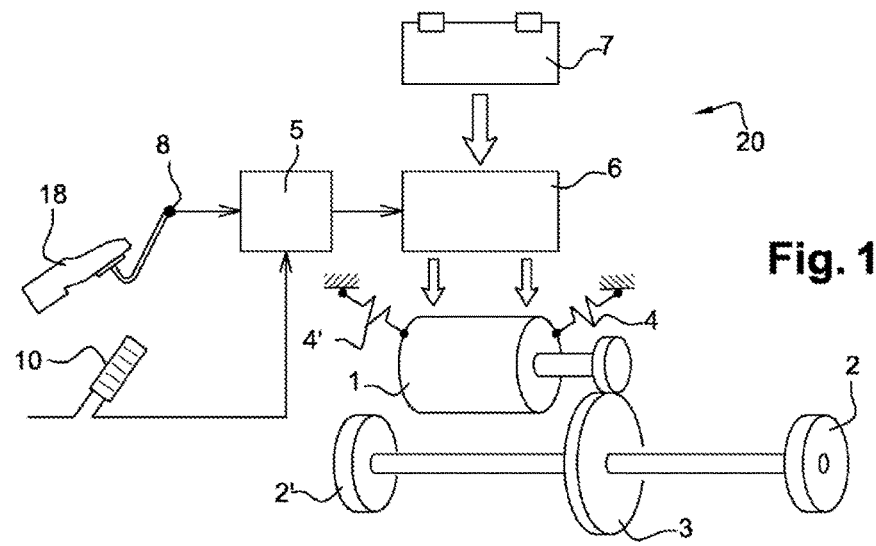
FIG. 1 is a schematic representation of the arrangement between different components of an electric or hybrid vehicle.

The invention relates to a method for controlling a power train of an electric or hybrid vehicle 20 immobilized in a parking position. In an electric or hybrid vehicle 20, the power train, which is designated in French by the acronym GMP, comprises, as represented schematically in FIG. 1, at least one electric motor 1, a reduction gear mechanism 3, motor mounts 4, 4', a device for controlling the power train and a battery 7 intended to supply the electric motor 1. The latter generates a motor torque which is transmitted to the wheels 2, 2' (two wheels are represented in FIG. 1) by means of the gear reduction mechanism 3 in order to drive the vehicle 20.

The device for controlling the power train comprises at least one control computer 5 (ECU), one power electronics unit 6, a plurality of means of detection such as angular position sensors, a gas control sensor, a brake control sensor (on the brake pedals) and a sensor of the position of a parking brake device, enabling the detection and/or the measurement of different values of parameters or variables in such a way as to define a status of the vehicle 20.

The latter likewise comprises a control unit 8, which actuates hydraulic actuating means (not illustrated) capable of reducing the speed (braking), or even of reducing the speed until the vehicle 20 has been brought to a halt. This control unit 8 generally comprises a brake pedal having the ability to be actuated by the foot 18 of the driver or occupant of the vehicle 20. The control unit 8 may adopt a position of engagement, in which the latter is actuated by the driver, and a position of disengagement, in which the control unit 8 is no longer actuated by the driver.

Furthermore, the vehicle 20 comprises a parking brake device 9 intended to immobilize the vehicle 20 in a parking position. The parking brake device 9 is utilized essentially for extended stops by the vehicle (parking function).

The vehicle 20, of course, comprises other components which have not been described or illustrated for reasons of simplification and understanding of the invention.

In order to immobilize the vehicle in the parking position, the driver utilizes the parking brake device 9, which is actuated by a control means 10.

The control means 10 may be mechanical, for example an operating lever, or may be electrical, for example a "button". In the case of an automatic vehicle, the operating lever is a gearshift lever.

The parking brake device 9 may adopt an applied position, in which the electric motor 1 is immobilized, and a released position, in which the electric motor 1 may rotate. The electric motor 1 comprises a transmission shaft 14 forming a rotor and to which a toothed wheel 12 is connected coaxially.

Figure 2:
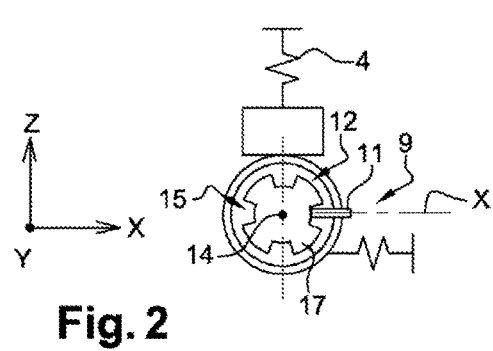
FIG. 2 is a schematic view of an electric motor interacting with a parking brake device in a position of equilibrium.
Figure 3:
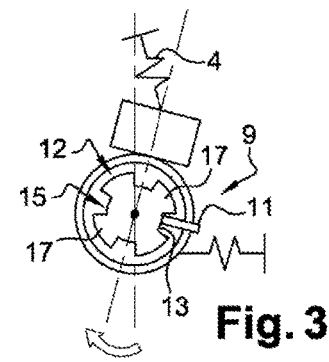
FIG. 3 represents schematically the electric motor tilting about a position of equilibrium, as illustrated in FIG. 2.

In FIGS. 2 and 3, the toothed wheel 12 has four teeth 17. The parking brake device 9 comprises a blocking finger 11 or "parking finger" intended to interact with the toothed wheel 12. The blocking finger 11 is mobile along an axis X between a position of disengagement, in which the transmission shaft and the toothed wheel are liberated and are able to rotate, and a position of engagement, in which one extremity 13 of the blocking finger 11 is engaged in an interdental space 15 of the toothed wheel 12 in order to immobilize the vehicle 20 in the parking position. The toothed wheel 12 and the transmission shaft 14 rotate about an axis Y which is perpendicular to the axis X. In the applied position of the parking brake device 9, the blocking finger 11 is engaged in the interdental space 15 of the toothed wheel 12, and in the released position of the parking brake device 9, the blocking finger 11 is disengaged from the interdental space 15 of the toothed wheel 12.

When the vehicle is immobilized on a surface exhibiting a zero slope P, the electric motor 1 occupies a neutral or stable position of equilibrium. In this position of equilibrium, the stresses applied to the parking brake device 9 are low, or even zero.

Figure 4:
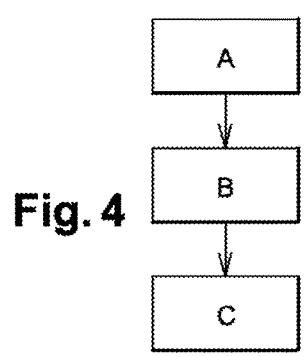
FIGS. 4 and 5 are block diagrams, represented in which are the steps of the method according to embodiments.

According to the invention and to FIG. 4, the method for controlling the power train of the vehicle 20 immobilized in a parking position comprises a step of detection A of the direction of and/or the data for a slope P when the parking brake device 9 is in its applied position. This is followed by a step of detection B of a transition from the applied position to the released position of the parking brake device 9. This is then followed by a step of application C of a motor torque setpoint Cp to the electric motor 1 depending on the direction of and/or data for the slope P detected at the moment of the detection of the transition from the applied position to the released position.

Figure 5:
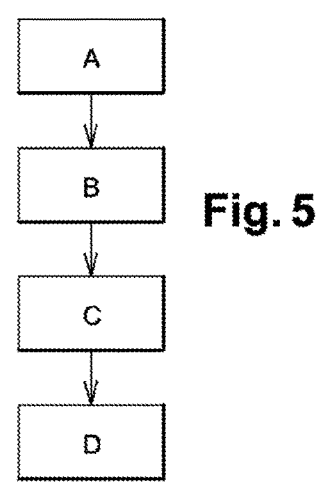

The method further comprises, as illustrated in FIG. 5, a progressive transition step D from a non-zero value of the motor torque setpoint towards a zero value, which will be described below.

Advantageously, the transition of the parking brake device 9 from the applied position to the released position, and back again, is implemented by the actuation of the means 10 for controlling the parking brake device 9.

According to one embodiment of the invention, the applied and released position of the parking brake device 9 is influenced by the engagement of the control unit 8 by the driver, signifying that the driver is in the vehicle and that the driver is capable of controlling the vehicle. The position of engagement or disengagement of the control unit 8 is detected and measured by a position sensor (not illustrated) connected to the control unit. The control unit 8 may comprise the actuation of a system for assisting with starting on an incline, known in English by the expression "Hill Start Assistant" and designated in English by the acronym HSA.

Preferably, the method of controlling the power train is executed by a software program stored in a memory of the computer 5.

In an embodiment of the method according to the invention, the step of detection A is performed only if certain information has been verified. If this information has not been verified, the program returns to the start of step A. The information which must be verified for step A is the following:

Parking brake device 9 in an applied position or in a released position. The status of the parking brake device 9 is verified advantageously by the position of the blocking finger 11. The engagement or the disengagement of the blocking finger 11 is detected by a position sensor.

End of the applied position of the parking brake device 9. This entry is verified by the sensor verifying the status of the parking brake device 9. More specifically, the end of the engagement of the blocking finger 11 is verified.

Data for the movement of the electric motor 1. These data are determined by at least one angular position sensor (not illustrated), which indicates the direction of displacement of the rotor 14 in relation to the position of equilibrium of the electric motor 1.

Figure 6:
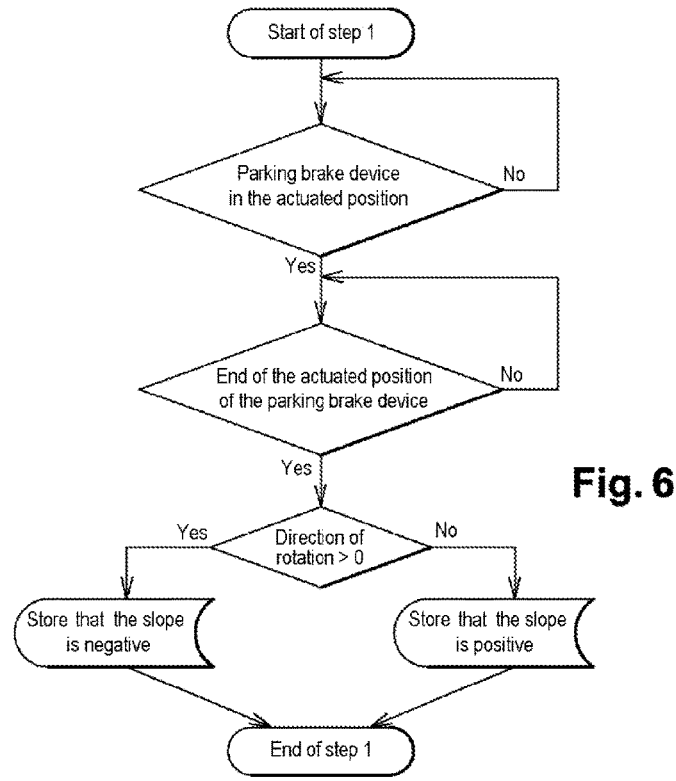
FIG. 6 illustrates, in the form of an algorithm, the different steps of the step of detection of the direction of and/or the data for a slope.

As illustrated in the algorithm in FIG. 6, the detection A of the direction of the slope is executed when it is detected, in step E, that the parking brake device 9 is in its applied position. In particular, the end of the applied position of the parking brake device 9 is verified.

As indicated previously, in order for the transition of the parking brake device into its applied position to take place, the program may verify in step G the position of engagement of the control unit 8. This guarantees that the rotor 14 will not rotate while the parking brake device 9 is actuated. When the end of the applied position of the parking brake device 9 is detected in G, the control unit 8 may be disengaged in step H.

The program then verifies the data for the movement of the electric motor 1. In particular, the direction of and/or the data for the slope P are determined with the help of a step K for detecting a direction of tilting of the electric motor 1 in relation to the position of equilibrium (stable position, zero slope) of the electric motor 1. It is determined whether, in the course of tilting, the electric motor 1 rotates in a negative direction or in a positive direction in relation to the clockwise direction.

In another embodiment, the direction of and/or the data for the slope P are determined with the help of a step K' for detecting the direction of rotation of a means for driving the rotor of the electric motor interacting with the parking brake device in order to immobilize the vehicle. More specifically, the angular position sensor detects, in the interdental space 15, the movement of the toothed wheel 12 in relation to the blocking finger 11. As previously, the positive or negative direction of rotation of the toothed wheel 12 is determined in relation to the clockwise direction. Of course, depending on the arrangement and the design of the electric motor 1 and the different elements of the power train, a positive rotation in the anticlockwise direction may indicate that the slope is positive.

According to yet another variant embodiment, the direction of and/or the data for the slope P are determined with the help of a step I for determining the value of the slope. This step of determination I is performed by means of a system for controlling the trajectory (not illustrated), such as an Electronic Stability Program (ESP). The system for controlling the trajectory comprises an accelerometer capable of measuring a longitudinal acceleration of the vehicle at any moment in order to determine the angle and/or the inclination of the slope P. The detection step A and the determination step K may be concurrent.

The method similarly comprises a step J for storing the direction and/or the data (including the value of the slope determined in step J for the detected slope P. The latter are transmitted and are then stored in the computer 5 during the immobilization of the vehicle in such a way that they are available on the next occasion on which the vehicle 20 is started. In the embodiment involving the deployment of the accelerometer, the direction of and/or the data for the slope P are obtained (read) at the time of starting the vehicle. These data are then transmitted, and are then stored in the computer 5.

Once the direction of and/or the data for the slope have been detected and stored, the computer 5 calculates the motor torque setpoint Cp to be applied to the electric motor 1, as provided for in step C. The value of the motor torque setpoint Cp is defined at the time of the adjustments that are carried out for the fine-tuning of the vehicle prior to its commercialization. This motor torque setpoint Cp will enable the power train (GMP) to apply a force to the electric motor 1 allowing the cancellation of that exerted on the parking brake device 9 in order to maintain the electric motor 1 in a position of equilibrium before the disengagement of the blocking finger 1.

The value of the motor torque setpoint Cp depends on the data for the rotation of the means of driving the rotor, or on the force exerted on the parking brake device 9. The sign of the motor torque setpoint Cp may be negative or positive, depending on the direction of the slope P.

Figure 7:
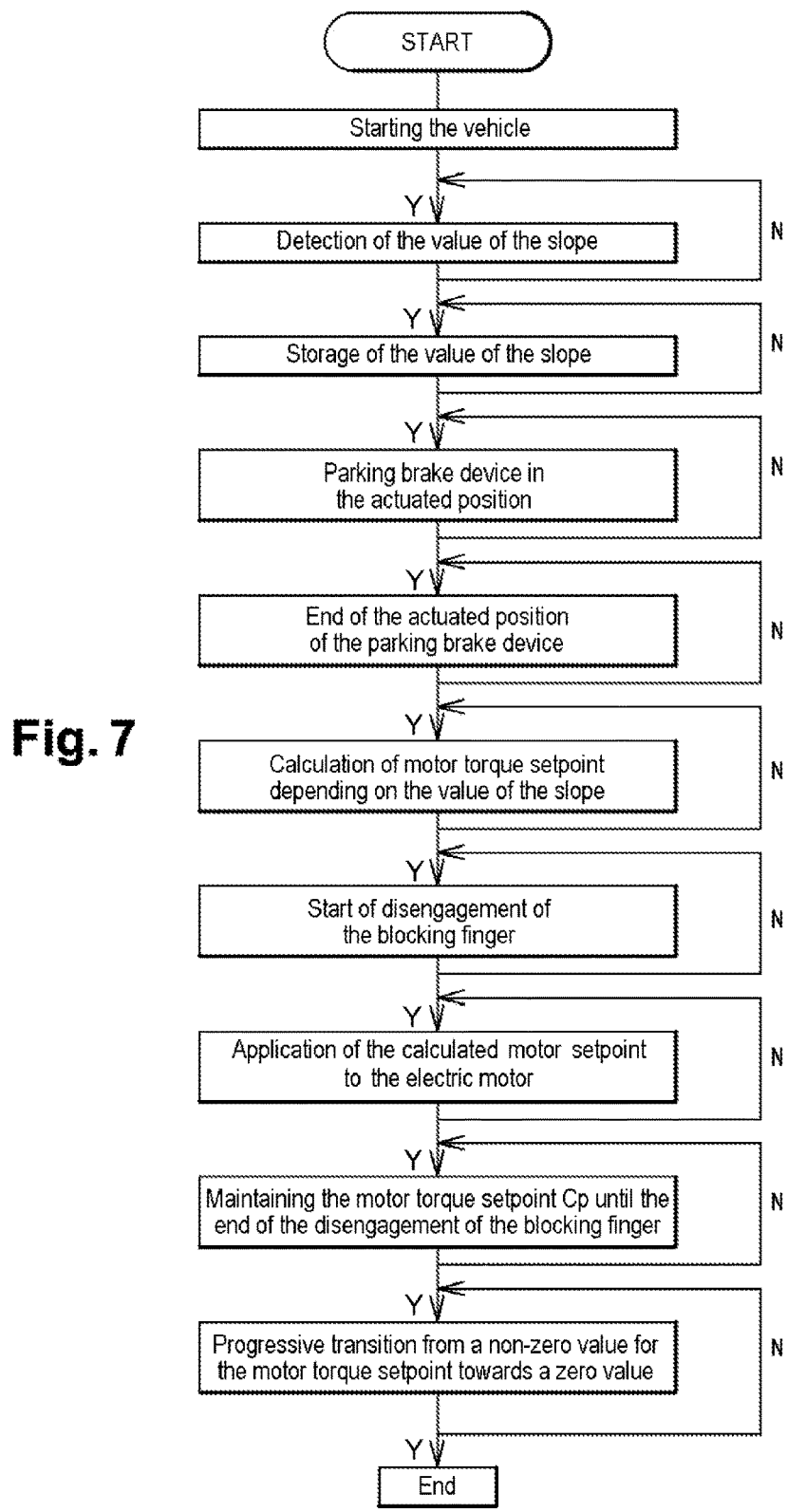
FIG. 7 illustrates, in the form of an algorithm, the different steps of the method of controlling a power train (GMP) according to an embodiment utilizing an ESP.

Alternatively, or in a complementary manner, the value of the motor torque setpoint Cp is based on the data for the inclination or the angle of the slope P, and/or of the vehicle, if the information is available at the time of starting the vehicle (for example by means of the ESP). The angle may be expressed in radians, in degrees or as a percentage. The calculation of the motor torque setpoint Cp may be defined on the basis of the following equation: $Cp = M \times g \times \sin(\alpha) \times R/r$; M being the mass of the vehicle which is considered to be constant; g being the constant of the acceleration due to gravity; $\alpha$ being the angle of the inclination; R being the radius of the wheel, and r being the transmission reduction ratio. The motor torque setpoint Cp calculated in this way is applied to the electric motor in order to reduce, or even to suppress, the oscillations. The algorithm in FIG. 7 illustrates an example of the functioning of the method for controlling a power train utilizing the ESP system.

The motor torque setpoint Cp is maintained from the start of the transition from the applied position to the end of the transition to the released position, in such a way as to maintain the electric motor 1 in the position into which it or the means of driving the rotor has tilted. Jolts, oscillations, etc., are avoided in this way.

Figure 8:
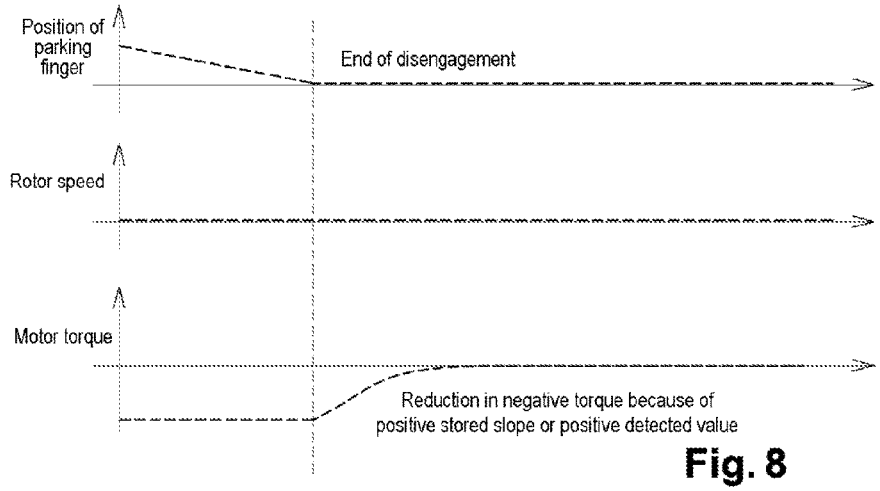
FIG. 8 is a time chart, represented in which is the progressive return of the motor torque towards a zero value according to a step involving the progressive transition of the value of the motor torque setpoint, as proposed by the invention.

Subsequently, in order to return the electric motor to its stable position of equilibrium (zero slope), the value of the motor torque setpoint Cp that has been calculated by the computer 5 is returned progressively towards a zero value, as represented in the time chart in FIG. 8. This return to equilibrium is performed in a controlled manner by progressively reducing the motor torque to zero.

The invention is described in the above by way of example. It is understood that a person skilled in the art will be able to arrive at different variant embodiments of the invention, for example by associating the different characterizing features above, taken either alone or in combination, without however going beyond the scope of invention.

The invention claimed is:

1. A method for controlling a power train of a vehicle immobilized in a parking position, the vehicle being equipped with a parking brake device for immobilizing the vehicle and with at least one electric motor, the method comprising:
    applying the parking brake to an applied position by inserting a blocking finger of the parking brake into an interdental space of a toothed wheel attached connected to a transmission shaft of the electric motor;
    detecting a direction of and/or data for a slope when the parking brake device is in the applied position, including detecting a rotation of the toothed wheel via an angular position sensor to determine the direction of and/or the data for the slope;
    detecting a transition of the parking brake device from the applied position to a released position; and
    applying a motor torque setpoint to the electric motor on the basis of the detected direction of and/or the data for the slope.

2. The method as claimed in claim 1, further comprising progressive transiting from a non-zero value of the motor torque setpoint towards a zero value.

3. The method as claimed in claim 1, wherein the applying the motor torque setpoint is maintained from a start of the transition from the applied position to an end of the transition to the released position.

4. The method as claimed in claim 1, wherein the transition of the parking brake device from the applied position to the released position, and back again, is implemented by actuating a means for controlling the parking brake device.

5. The method as claimed in claim 1, wherein the detecting the direction of the slope is carried out when a control unit of the parking brake device is in a position of disengagement and when the parking brake device is in the applied position.

6. The method as claimed in claim 1, wherein the detecting the direction of and/or the data for the slope further comprises determining a value of the slope.

7. The method as claimed in claim 6, wherein the detecting the direction of and/or the data for the slope and the determining the value of the slope are concurrent.

8. The method as claimed in claim 1, wherein the detecting the direction of and/or the data for the slope further comprises detecting a direction of tilting of the electric motor in relation to a neutral position of said electric motor.

9. The method as claimed in claim 1, further comprising storing the direction of and/or the detected data for the slope.

10. A device for controlling a power train of a vehicle immobilized in a parking position, the vehicle being equipped with a parking brake device for immobilizing the vehicle and with at least one electric motor, the device comprising:
    a controller configured to apply the parking brake to an applied position by inserting a blocking finger of the parking brake into an interdental space of a toothed wheel attached connected to a transmission shaft of the electric motor
    means for detecting a direction of and/or data for a slope when the parking brake device is in the applied position, the means for detecting including an angular sensor that detects a rotation of the toothed wheel to determine the direction of and/or the data for the slope;
    means for detecting a transition of the parking brake device from the applied position to a released position; and
    means for applying a motor torque setpoint to the electric motor on the basis of the detected direction of and/or the data for the slope.

11. A motor vehicle, comprising:
    a power train;
    a parking brake device to immobilize the vehicle in a parking position;
    at least one electric motor; and
    the device for controlling said power train as claimed in claim 10.

12. The device for controlling said power train as claimed in claim 10, wherein the means for detecting the transition of the parking brake device includes a position sensor.

13. The device for controlling said power train as claimed in claim 10, wherein the means for applying the motor torque setpoint includes at least one control computer.

14. The device for controlling said power train as claimed in claim 13, wherein the control computer is an electronic control unit.

* * * * *